Jan. 16, 1934.  B. F. HAMILTON  1,943,600
WELDING MACHINE
Filed July 29, 1932
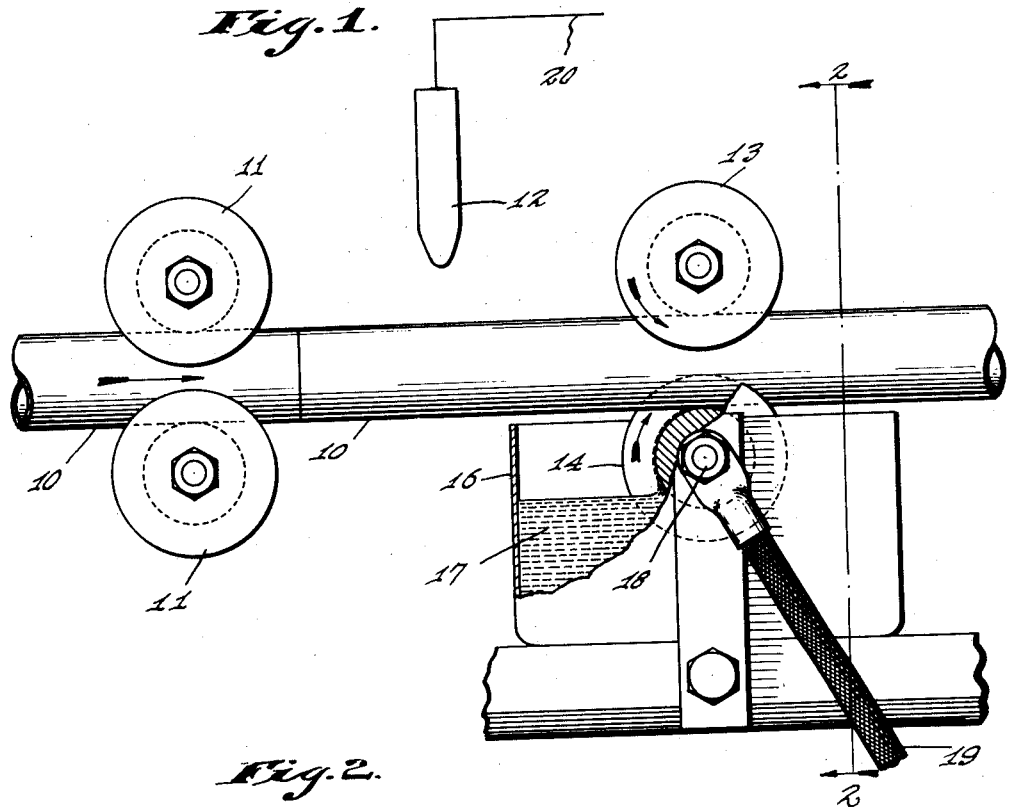
Fig. 1.
Fig. 2.
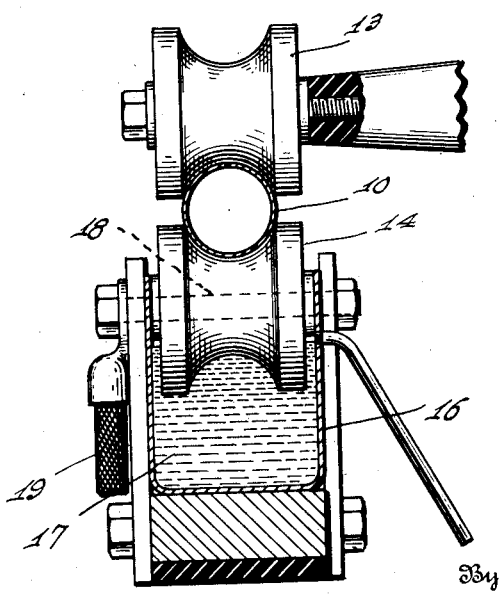
Inventor
BERTIS F. HAMILTON,
By
Attorneys Patented Jan. 16, 1934

1,943,600

UNITED STATES PATENT OFFICE 1,943,600

WELDING MACHINE

Bertis F. Hamilton, Columbus, Ind., assignor to Noblitt-Sparks Industries, Inc., Columbus, Ind., a corporation of Indiana Application July 29, 1932. Serial No. 625,752

3 Claims. (Cl. 219—8)

My invention is concerned with machines for performing a continuous arc welding operation, and particularly with such machines in which the work being welded forms one of the arc electrodes.

In the past, considerable difficulty has been experienced in providing a suitable electrical contact for the article or material being welded as it passes through the machine. Brushes contacting directly with the article or material being welded have been used; but the contact so provided is relatively imperfect and results in fluctuations in current-strength which in turn may cause imperfections in the weld. Another expedient heretofore employed has been to clamp the material or article to be welded in a fixture which is permanently connected to the current-source by a flexible cable. This method has been objectionable in that, by reason of the necessity for inserting work in the fixture and removing it therefrom, it does not lend itself to quantity production; the resistance for the path followed by the electric current varies as the work progresses through the machine; and the presence of the flexible cables, especially if the article being welded is of comparatively great length, is objectionable.

It is the object of my invention to provide in a welding machine of the type above referred to means which will provide an adequate electrical contact with the work and which will at the same time maintain a substantially constant resistance for the path over which the electric current travels between the contact and the arc.

The accompanying drawing illustrates an embodiment of my invention: Fig. 1 is a front elevation of the device showing the contact and feed rollers and contact; and Fig. 2 is a transverse vertical section on the line 2—2 of Fig. 1.

The drawing illustrates an embodiment of my invention as used in a machine adapted for the welding of tubing formed from sheet-metal. The formed tubing 10 enters the machine between feed rollers 11 with the abutting edges which are to be welded together uppermost. The rollers 11 are suitably driven in opposite directions by any suitable means and clamp the tubing 10 resiliently between them. By the action of the rollers, the tube is fed past the electrode 12 which may be either of carbon or metal. Beyond the electrode 12, the tube 10 passes between two idler rollers 13 and 14. The roller 14 is disposed below the tubing and is mounted on a fixed axis, while the roller 13 is located above the tubing and is so arranged as to hold the tubing in contact with the roller 14.

The roller 14 is of metal or other conducting material and is mounted in association with an open-topped vessel 16 adapted to contain a supply of liquid 17 into which the roller 14 dips.

Conveniently, the roller 14 is rotatably mounted on a metal spindle 18 which passes through the front and back walls of the vessel 16. The spindle 18 and the electrode 12 are connected to opposite sides of a suitable current source as by wires or cables 19 and 20. Conveniently the cable 19 is held in position by a nut on the end of the spindle 18, which nut serves to maintain the terminal in engagement with the front wall of the tank or vessel 16. This tank is conveniently made of sheet metal or other conducting material so that the roller 14 is electrically connected with the cable 19 both through the spindle 18 and the liquid in the tank.

It is customary in machines of this kind to insulate the work from the frame of the machine, and to this end any parts of the machine which are electrically connected with the tubing 10 are insulated from the frame of the machine.

The liquid-bath 17 may be composed of any suitable constituent or constituents so long as it is sufficiently viscous to adhere to the surface of the roller 14 to be carried upwardly into contact with the tube and at the same time does not offer excessive resistance to the passage of the electric current. Because the liquid film between the work and the roller 14 is thin, it is not necessary that the liquid composing the bath 17 be highly electrolytic. I have found to be suitable for the bath 17 water in which there has been dissolved sufficient soluble oil of the type used in metal-cutting operations to render the mixture viscous enough to adhere to the roller as it rotates.

I have found that a contact of the type described eliminates many of the objectionable features of contacts such as have previously been used for the same purpose. The contact with the work is constant, is not interrupted by foreign matter which may find its way between the work and the roller 14, and provides a current-path of substantially constant resistance, with the result that the arc does not fluctuate in a manner which would tend to cause imperfections in the weld.

While I have shown my invention as embodied in a machine especially fitted for the welding of tubing, it will be readily apparent that it is equally suitable for use in any continuous welding operation where the work is fed through the machine.

I claim as my invention:

1. In a continuous arc-welding machine, a pair of superposed rollers between and in contact with which the article being welded is fed as it is welded, a tank associated with the lower of said rollers, a supply of conducting liquid in said tank, the parts being arranged so that the lower roller dips into said liquid, and an electrical connection to said lower roller, said liquid being sufficiently viscous to adhere to the lower roller as it rotates whereby said liquid will be carried into contact with the article being welded.

2. In a continuous arc-welding machine, a roller over and in contact with which the article being welded is fed as it is welded, a tank associated with said roller, a supply of conducting liquid in said tank, the parts being arranged so that said roller dips into said liquid, and an electrical connection to said roller, said liquid being sufficiently viscous to adhere to said roller as it rotates whereby said liquid will be carried into contact with the article being welded.

3. In a continuous arc-welding machine, a roller over and in contact with which the article being welded is fed as it is welded, a tank associated with said roller, a supply of conducting liquid in said tank, the parts being arranged so that said roller dips into said liquid, said tank being formed of conducting material, and an electrical connection to said roller and said tank, said liquid being sufficiently viscous to adhere to said roller as it rotates whereby said liquid will be carried into contact with the article being welded.

BERTIS F. HAMILTON.